(No Model.) 3 Sheets—Sheet 1.

J. F. STEWARD.
MOWING MACHINE.

No. 563,815. Patented July 14, 1896.

Witnesses
Arthur Johnson
J. W. Latimer

Inventor
John F. Steward (No Model.) 3 Sheets—Sheet 2.
J. F. STEWARD.
MOWING MACHINE.
No. 563,815. Patented July 14, 1896.
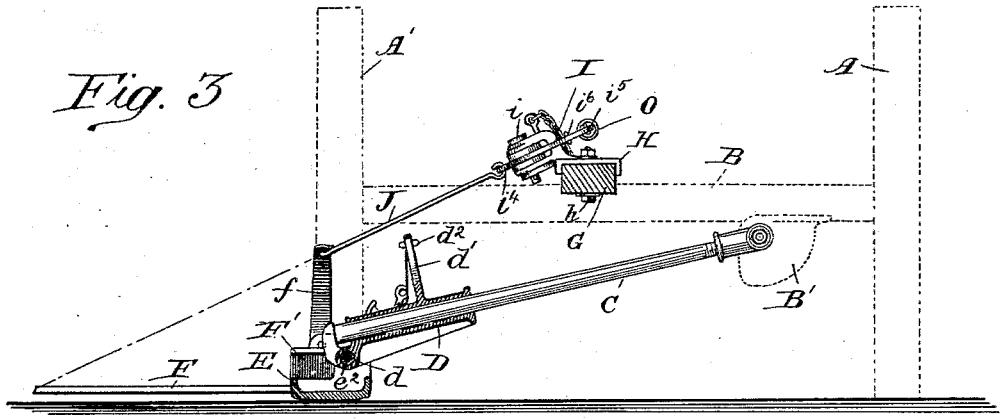
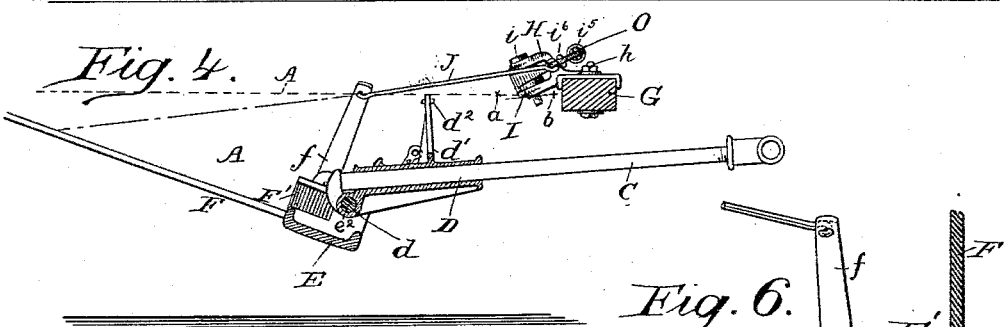
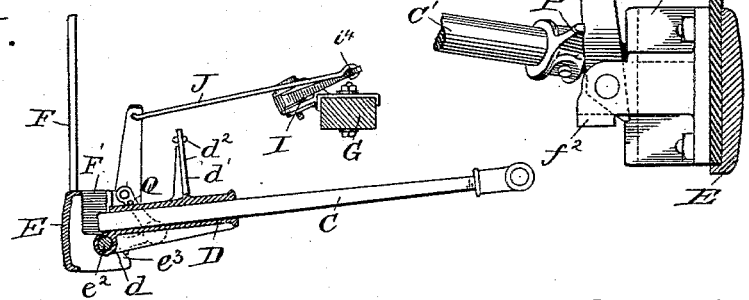
Witnesses
Arthur Johnson
J. W. Latimer
Inventor
John F. Steward (No Model.) 3 Sheets—Sheet 3.

J. F. STEWARD.
MOWING MACHINE.

No. 563,815. Patented July 14, 1896.

Witnesses
Arthur Johnson
J. H. Latimer

Inventor
John F. Steward

UNITED STATES PATENT OFFICE.

JOHN F. STEWARD, OF CHICAGO, ILLINOIS.

MOWING-MACHINE.

SPECIFICATION forming part of Letters Patent No. 563,815, dated July 14, 1896.

Application filed December 5, 1895. Serial No. 571,152. (No model.)

*To all whom it may concern:*

Be it known that I, JOHN F. STEWARD, of Chicago, in the county of Cook and State of Illinois, have invented certain new and useful Improvements in Mowers, of which the following is a full description, reference being had to the accompanying drawings, in which—

Figure 1:
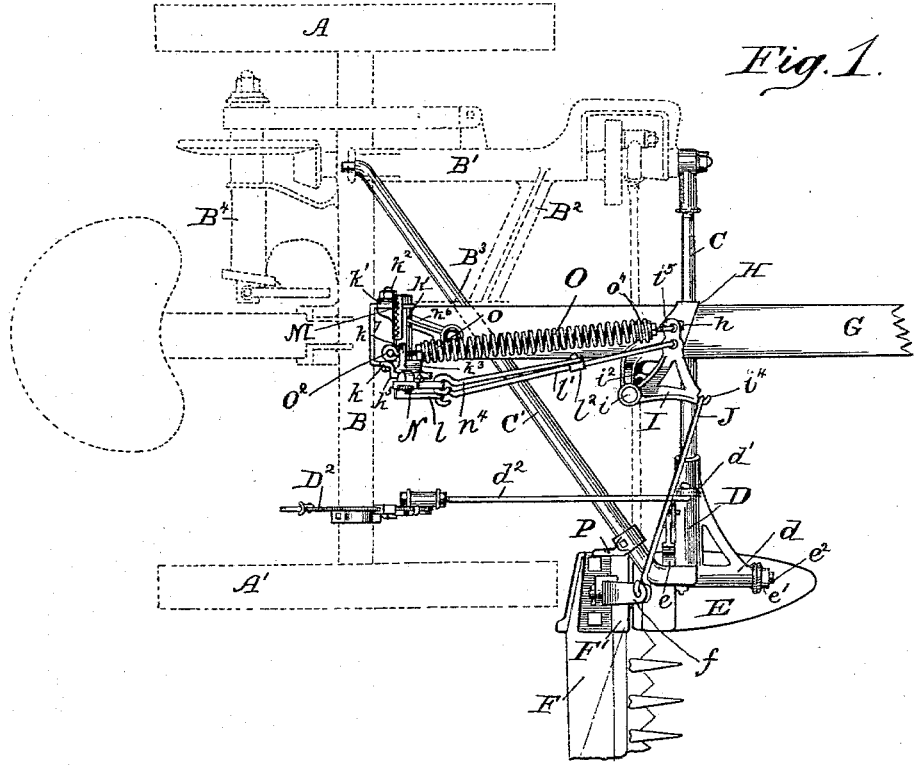
Figure 2:
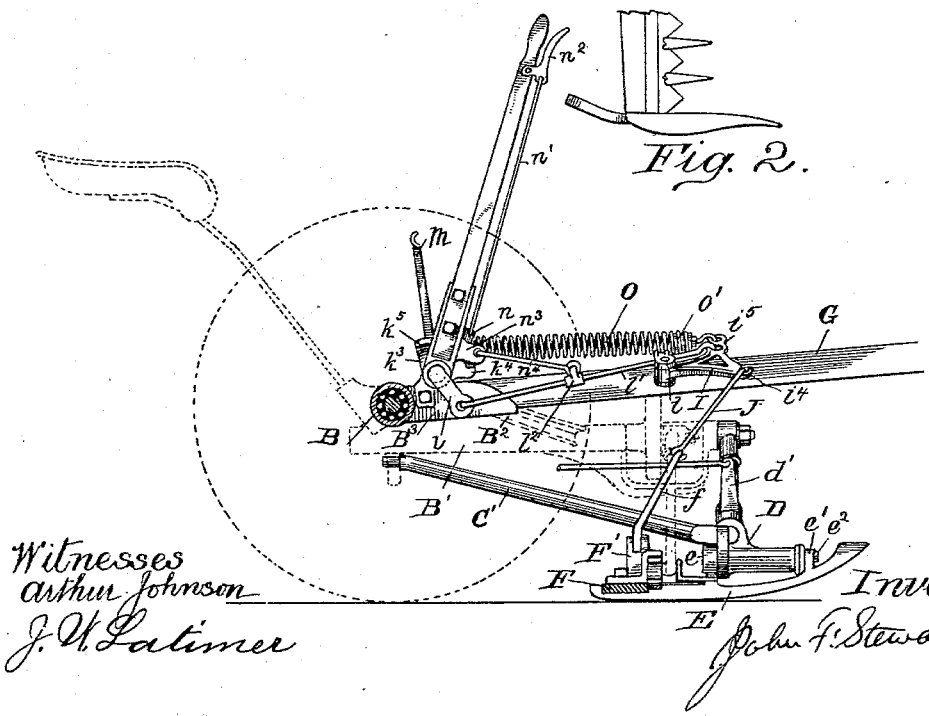

Figure 1 is a plan view of a mowing-machine, mainly in dotted outline, but with the parts forming the subject-matter of my invention represented in full line. Fig. 2 is a side elevation of the same parts. Figs. 3, 4, and 5 are front elevations of the same; and the remaining views, Figs. 6, 7, 8, 9, 10, 11, and 12, are details of construction.

The object of my invention is to provide a mowing-machine with a hand lifting-lever and foot lifting-lever combined with each other and with a spring so connected to the cutting apparatus as to support a large part of the weight of the latter and to so connect the lifting-spring with the cutting apparatus as to affect the poise of the latter in the most direct manner, thus avoiding friction in the joints of the coupling-frame and the said cutting apparatus.

The gearing-frame of the mowing-machine (shown in dotted lines) may be considered as of any suitable kind.

A and A' represent the supporting-wheels; B, B', $B^2$, $B^3$, and $B^4$, the gearing carriage-frame.

The parts represented by B, B', $B^2$, $B^3$, and $B^4$ are all formed together, that is, in one casting. Through the sleeve-like portion B the axle passes. Through that B' the crank-shaft passes. To the part $B^3$ the tongue is secured.

$B^2$ is a brace-like part connecting the tongue-seat with the sleeve B'. To the part B', at its front and below it near its rear, is secured the coupling-frame, consisting of a single bar formed as shown in Fig. 1 and may be said to consist of the transverse bar C and the diagonal bar C'. Upon this coupling-frame at its grass end is loosely connected the swivel D. This swivel is provided with a sleeve-like portion $d$, adapted to rest between the vertical lugs $e$ and $e'$ of the shoe E. Through said lugs is passed a hinge-pin $e^2$. The bar C forms an axis upon which the swivel D may rock, and, in consequence, upon which, as an axis, the cutting apparatus may rock. In order that the cutting apparatus may be tilted as desired, an arm $d'$ extends upwardly therefrom, which arm is connected to the tilting-lever $D^2$ by the rod $d^2$. To the shoe E the finger-bar F is secured by being clamped between the shoe proper and the knife-head cap F'.

So far as described the devices form no part of my present invention but represent, simply, the form of machine to which I have applied my improvements. To the knife-head cap I secure the upreaching arm $f$. The manner of connecting the arm $f$ to the shoe-cap is represented in Fig. 6, which figure is a sectional rear elevation of the parts in the position they occupy when the bar is folded upwardly for transportation. In the figure the cutting apparatus is shown to be folded upwardly, in which position the arm $f$ and finger-bar are parallel, but it will be readily understood that if the bar be unfolded the stop $f^2$ will strike the arm $f$ a little before the bar becomes horizontal. It will be seen that the jointing of the arm to the knife-head cap, or, as I may say, to the inner end of the cutting apparatus, ceases to be a free joint when the cutting apparatus is in position for work.

Figure 9:
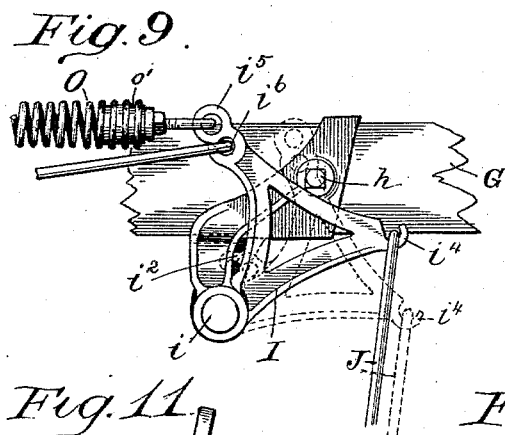
Figure 10:
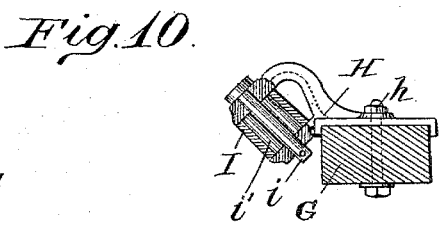
Figure 11:
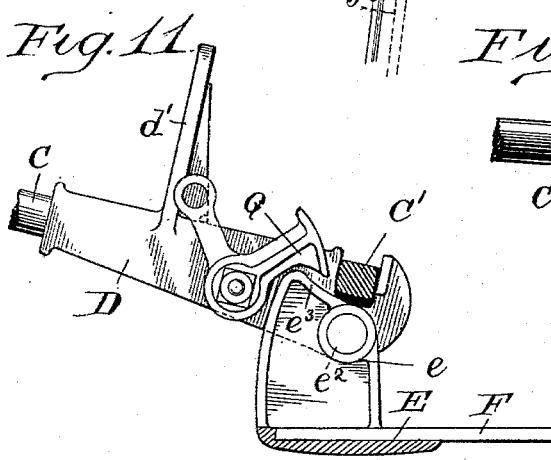
Figure 12:
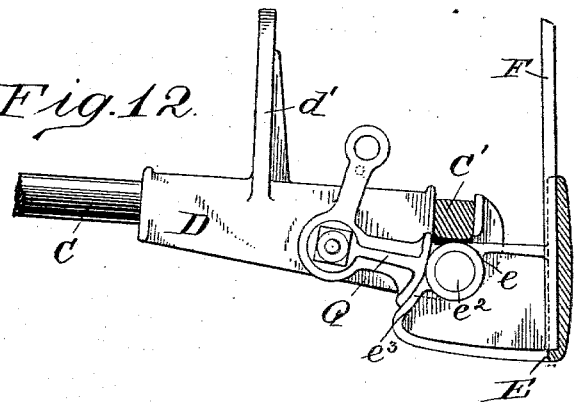

G is the draft-tongue. To this is secured the bracket H, by means of the bolt $h$. This bracket is formed, as shown in Fig. 10, so that the hub of the bell-crank I can rest between two lugs formed thereon and receive the pin $i$. In order that the bell-crank may move as freely as possible, I apply antifriction-rollers $i'$. In order that the bell-crank may escape contact with the lug-like portions of the bracket H when the parts are in working position, it is formed as shown in Figs. 1 and 9. It is sometimes desirable, particularly when connecting the parts that serve to transmit movement from the bell-crank to the cutting apparatus, to hold the bell-crank in the position shown in Fig. 1. In order that this may be accomplished, I provide the bell-crank I with the projection $i^2$. If it is desired to hold the parts in the position shown in the figure, a punch or such other tool as always accompanies mowers is thrust between the said projection $i^2$ and the lugs of the bracket H. The punch or other article so inserted forms a gag that holds the parts in the position desired.

In Fig. 3 a locking device is shown to be inserted. It consists, in this case, of a pin secured by a chain to the bracket H. This arrangement of the bracket, the bell-crank, and the pin may be considered as means for locking the parts and holding the spring in its extended position. From the hook $i^4$ on the bell-crank to an eye in the top of the arm $f$ is extended the rod J. Upon the frame of the machine, within a suitable distance relative to the driver's seat, is placed the bracket K, having the lugs $k$ and $k'$, adapted to extend downwardly, so that the bolt $k^2$ can pass through the tongue and through the tongue-seat portion $B^3$ of the main frame. Upon the bracket K is formed the quadrant $k^3$, having the stop $k^4$ and $k^5$. There is also formed in this bracket a sleeve $k^6$, through which the rock-shaft L passes. Upon the bracket is also formed the lug $k^7$, through which the bolt that sustains the spring passes. Upon the bracket K the lifting-lever N is supported. It is preferably so pivoted that its axis of movement shall be coincident with the axis of the rock-shaft L, but not necessarily so. If the axis of the lifting-lever is coincident with the shaft L, the quadrant $k^3$ must be given, as shown, a certain definite position relative to the said axis. If, however, the axis of the lifting-lever is not made coincident with the shaft L, then the quadrant must be placed in a definite position relative to the lever and regardless of the shaft L. I prefer the construction shown, however, because of compactness and the possibility of making two parts serve many purposes.

Figure 7:
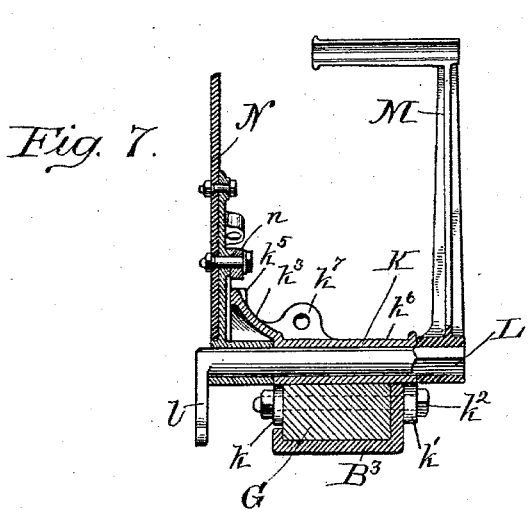
Figure 8:
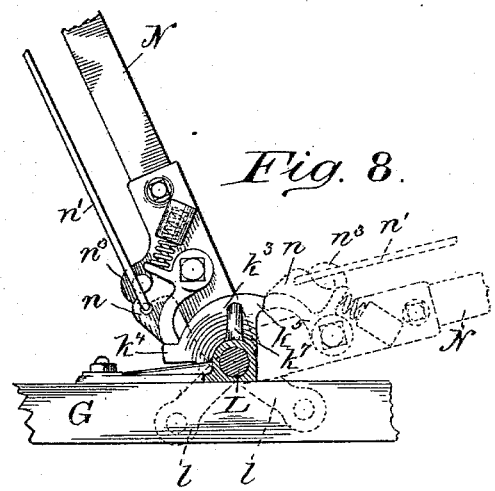

It will be seen in Fig. 7 that the sleeve-like portion $k^6$ does not extend as far grassward as the shaft L, and that the lifting-lever is pivoted directly upon the shaft. In short it is seen that the lever is pivoted directly to the shaft. All things considered, the construction shown is the preferable one. The lever N is provided with the spring-latch $n$, which latch is controlled by the thumb-latch and rod $n'$ and $n^2$. (Shown in Fig. 2.) Upon the hub of the lever is also formed the lug $n^3$. Formed upon the shaft L is the arm $l$, having an eye in the extremity thereof. Upon the other end of the same shaft, squared for the purpose, is placed the foot-lever M.

O is the lifting-spring. Into each end are threaded plugs $o$ and $o'$. Into $o'$ is screwed a hook adapted to engage the eye $i^5$ of the bell-crank, and into the plug $o$ is screwed the threaded eyebolt $o^2$. By means of the latter bolt the tension of the spring may be increased or decreased at will. From the eye in the arm $l$ to the eye $i^6$ in the bell-crank extends the rod $l'$. It will be readily seen that if the foot-lever be pressed forward the rod $l'$ will be drawn backward and the bell-crank moved upon its axis to lift the cutting apparatus. Upon the rod $l$ I secure the connecting-piece $l^2$, and from this to the lug $n^3$ on the lifting-lever I extend the rod $n^4$. It will now be seen that if the lifting-lever be moved over to the rear the bell-crank will be swung, as already explained. It will also be seen that the foot may be applied to the foot-lever and the hand to the lifting-lever, the former forced forward and the latter rearward, and thus a double-lifting action produced, to raise the bar from the ground. The spring should be given such tension as to cause the bar to rest lightly on the ground, but not enough to raise the latter or prevent it from falling promptly after passing over elevations. In order that the lifting apparatus may affect the cutting apparatus all of its length, that is, act so that part of the weight of both ends shall be taken, in a simple manner, I place my connecting mechanism so that the direction of the rod J may be such that if extended, as shown by dotted lines in Figs. 3 and 4, it will reach to a point that is as near as may be to the center of gravity of the cutting apparatus. By this is meant, however, only the center of gravity of the bar when considered relatively to its length. It will be seen by referring to Fig. 1 that if the rod J were extended, as shown in dotted lines, it would reach a point rearward of the center of gravity of the cutting apparatus, when considered relative to its fore-and-aft width. The object of this is to give a slight inclination to so rock the cutting apparatus on the axis C as to prevent it from tilting upward too freely and incline to pass over the grass to be cut.

As has already been seen, I wish to make particularly clear by reference to Figs. 3, 4, 5, and 10 that the plane of movement of the bell-crank is diagonal, relative to the horizon, so that in its angular sweep it may transmit the stress of the spring directly to the cutting apparatus. This is an important feature, as several beneficial results are reached. It enables me to connect the bell-crank by a single rod to the arm F of the cutting apparatus and thus avoid the complicated connections heretofore used; but most important is the fact that it permits the part of the bell-crank to which the rod J is secured to raise to a higher position when sustaining the cutting apparatus above ground than when the latter is in its working position. This movement is beneficial for the reason that the higher the bar is raised the higher the point of support formed by the hook of the bell-crank is moved, the result being that the direction of stress of the link J is effective more nearly upon the center of gravity at all times than if the arm of the bell-crank had not the diagonally-upward movement referred to. This will be understood by reference to Fig. 4.

If the point of contact of the rod J and bell-crank had moved in a horizontal direction from the points indicated by the cross $a$ to that of $b$, then it will be seen that the dotted line A, representing the direction of stress, would extend far toward the outer end of the cutting apparatus. The result would be that the higher the bar was lifted the more the tendency would be to lift the outer end thereof, and the higher the said outer end became raised the more easily it would be lifted than the inner end, and consequently the inner end not lifted from the ground. Experiment has shown the statements to be true, the result of horizontal movement of the bell-crank being to start the bar as a whole upward and then, upon further movement of the lever or levers, throw the outer end of the bar upward and permit the inner or main shoe end to drop near the ground. By so placing the bell-crank that the plane of movement of the arm to which the rod J is connected, the line of stress of the rod is maintained as nearly as possible, so as to be always in a substantially definite position relative to the length of the bar, so that, whether the bar be raised or lying upon the ground, the proper effective stress applied to each end thereof, as it were, is always maintained. It must be clearly borne in mind that the whole effort is to produce, in effect, a poise that shall be due to a lifting stress that, if extended, should strike the cutting apparatus substantially at the center of gravity when referring to the length of the same, that is to say, the effective direction of stress should be such that the tendency will not be to lift the outer end any more than the inner end of the cutting apparatus. It may be desirable sometimes to depart from the position of the center of gravity in the bar. In fact, I have found it to be so, as it is preferable, in order to not bend the bar upward too much by the stress of the spring, to not proportion the parts so as to lift the outer end of the bar quite as much as the inner end. In short, I find it to be better to permit the outer end to rest slightly heavier on the ground than the inner end. Be this as it may, by placing the axis of the spring-held lifting-lever at an angle substantially as shown the particular point selected upon the cutting apparatus as the effective point of stress in poising the same is little disturbed. When the bar is folded for transportation, I so provide that its weight may be sustained by the lever and spring connections. In order to do this, it is necessary that the arm $f$ shall remain substantially vertical relative to the horizon, and hence the stop P is secured to the bar $C'$ at such a point that when the cutting apparatus is folded upward the said arm shall come in contact therewith. Thus held, the rod J becomes a support that sustains the coupling-bar and cutting apparatus above ground. In order to hold the said cutting apparatus in its vertical position, a latch Q is pivoted to the swivel and adapted to fall to the position shown in Fig. 12 and rest against the projection $e^3$. When the bar is extended, the latch remains in the position shown in Fig. 11.

In all mowers it is essential that the shoes and guards of the cutting apparatus be sled-runner like beneath, so as to pass over inequalities of the ground. This necessary shape of the parts tends to cause the cutting apparatus to ride over the grass that should be cut. As the shoe E particularly sometimes rides upon the cut swath of grain, its tendency is to raise at its forward end, as the forward end of a sled-runner will raise in passing over an obstruction, and thus tend to turn the guards and cutting apparatus proper above the grass to be cut. It is sometimes desirous to leave the cutting apparatus free to rock by rendering the latch-lever nut of the lock-lever $D^2$ inoperative, that is, by preventing it from locking.

The peculiarities of the lever necessary to keep it unlocked forming no part of this invention and being well known in the art need not be described. Suffice it to say that at times the cutting apparatus is free to rock, because of the swivel D being free to move upon the bar C of the coupling-frame. In order that the lifting-spring shall have its stress in part directed to rocking the cutting apparatus on the axis formed by the coupling-bar C upward at the rear and hence downward in front, the arm $f$ is secured well behind the said axis formed by the bar C, so that the effort shall be to draw the upward end of the said arm $f$ forward, as well as tend to pull it grassward. In short, the lifting-spring is adapted to exert itself to keep the cutting apparatus well down, and thus counteract the tendency of the said cutting apparatus to rock upward in front and pass over the grass to be cut.

In order to connect the bell-crank to the hand lifting-lever and foot lifting-lever and so provide that the moving parts shall not come in contact with the tongue, I place the bracket H so high that the spring and the rods connecting to the bell-crank may all lie over the said tongue. By so placing them I avoid what would otherwise be necessary, namely, the moving of all the parts so far grassward as to prevent them from clashing with the tongue. I am thus permitted to carry the rods connecting the hand and foot levers beside the tongue at the rear end and secure the spring O to the lever-bracket immediately over the tongue.

What I claim as my invention, and desire to secure by Letters Patent, is—

1. In a mower, the main frame, the coupling-frame pivotally secured thereto, the cutting apparatus pivotally secured to the said coupling-frame, an arm extending upward from the stubble end of the said cutting apparatus, a lever for sustaining and raising the said cutting apparatus, located upon the main frame over the said coupling-frame, and a connecting-link extending from said lever to the said arm upreaching from the stubble end of the cutting apparatus, the said lever adapted to move on an axis inclined grassward at its upper end, whereby the direction of stress of said link upon the cutting apparatus, relative to the center of gravity of the same, is substantially maintained as the latter travels over uneven ground, substantially as described.

2. In a mower, the main frame, the coupling-frame pivotally secured thereto, the cutting apparatus pivotally secured to the said coupling-frame, an arm extending upward from the stubble end of the said cutting apparatus, a spring-actuated lever for sustaining and raising the same located upon the main frame over the said coupling-frame, and a connecting-link extending from the said spring-actuated lever to the said arm upreaching from the stubble end of the said cutting apparatus, the said spring-actuated lever adapted to move on an axis inclined grassward at its upper end, whereby the direction of stress of said link upon the cutting apparatus, relative to the center of gravity of the same, is substantially maintained as the latter travels over uneven ground, substantially as described.

3. In a mower, the main frame, the coupling-frame pivotally secured thereto, the cutting apparatus pivotally secured to said coupling-frame, an arm extending upward from the stubble end of the said cutting apparatus, a bell-crank lever for sustaining and raising the same located upon the main frame, over the said coupling-frame, a spring connected at one end to one arm of said bell-crank lever and extended over the tongue and its other end secured to the main frame, and a connecting-link extending from the said spring-actuated lever to the said arm upreaching from the stubble end of the cutting apparatus, the said spring-actuated lever adapted to move on an axis inclined grassward at its upper end whereby the direction of stress of said link upon the cutting apparatus, relative to the center of gravity of the same, is substantially maintained as the latter travels over uneven ground, substantially as described.

4. In a mower, the main supporting-frame, the coupling-frame pivoted thereto, cutting apparatus pivotally connected to the coupling-frame upon an axis substantially in line with the length of the cutting apparatus, an arm extending from the stubble end of said cutting apparatus, a lifting-spring secured to the main frame of the said machine and mechanism connecting the said arm to the said spring extending diagonally forward from the said arm to the said spring lifting apparatus, substantially as described, whereby the stress of the spring is in part exerted to rock the said cutting apparatus over and forward and thus maintain the latter in the proper position for cutting.

JOHN F. STEWARD.

Witnesses:
ARTHUR JOHNSON,
J. W. LATIMER.